United States Patent [19]

Ferrari et al.

[11] 4,280,872
[45] Jul. 28, 1981

[54] CORE CATCHER DEVICE

[75] Inventors: Luciano Ferrari, Modena, Italy; Bernard Fourest, Boulogne, France; Gaston Kayser, Aix en Provence, France; Robert Martin, Grenoble, France

[73] Assignee: Commissariat a l'Energie Atomique, Paris, France

[21] Appl. No.: 918,370

[22] Filed: Jun. 23, 1978

[30] Foreign Application Priority Data

Jun. 23, 1977 [FR] France .............................. 77 19227

[51] Int. Cl.³ ........................ G21C 9/00; G21C 13/02
[52] U.S. Cl. ........................................ 176/38; 176/65
[58] Field of Search ........................ 176/38, 40, 87, 65

[56] References Cited

U.S. PATENT DOCUMENTS

| 3,554,868 | 1/1971 | Thorp | 176/40 |
| 3,719,556 | 3/1973 | Snyder | 176/38 |
| 3,992,256 | 11/1976 | Lleres | 176/38 |
| 4,011,132 | 3/1977 | Kumpt | 176/87 |
| 4,062,724 | 12/1977 | Broadley | 176/87 |

Primary Examiner—Edward F. Miles

[57] ABSTRACT

In a fast reactor having a diagrid structure supported on the bottom wall of a reactor vessel containing the core and liquid metal coolant, a core catcher serves in the event of core melt-down to prevent hot debris carried down by the liquid metal from coming into contact with the vessel walls. The core catcher comprises a single collecting tray having a large area, a central chimney and a bearing shell extending parallel to the bottom wall of the reactor vessel. An enclosed space is formed between the bottom wall, the diagrid support structure and the diagrid and contains the collecting tray. Under melt-down conditions, the temperature differences produced by the molten fuel deposited on the tray and the presence of the central chimney have the effect of setting up a natural circulation of liquid metal and consequently of cooling the fuel.

9 Claims, 3 Drawing Figures

CORE CATCHER DEVICE

The present invention relates to a core catcher associated with a fast nuclear reactor of the liquid-metal cooled type having a pressure vessel. This device is intended to collect reactor core elements which are liable to melt either partially or completely as a result of a fast temperature rise caused by a major operational accident condition and then to fall under gravity to the bottom of the reactor pressure vessel which contains the liquid metal.

A number of different designs of so-called core catchers or catchpots are already known. A device of this type generally consists of a structure of mechanically welded sheet metal plates mounted beneath a diagrid which supports fuel assemblies of the reactor core, the diagrid being in turn supported by a metallic structure which bears on the bottom wall of the pressure vessel. In a typical design, a core catcher is constituted by an array of cups or the like which are separated from each other and each capable of collecting part of the molten reactor core. The core catcher is so arranged that the liquid metal coolant contained within the reactor vessel is caused by an effect of convective heat transfer to circulate around the core catcher while producing a cooling action on this latter. As disclosed in particular in the U.S. Patent Application Ser. No. 589,881, now abandoned, filed on June 24, 1975, provision has already been made in a core catcher of this type for passages which extend through the diagrid support structure. Thus the cooled liquid metal collected within the pressure vessel at the outlet of heat exchangers of the reactor is circulated through said passages in order to produce a powerful cooling action on the core catcher while preventing any unacceptable temperature rise by removal of residual heat from the portions of molten reactor core which have thus been collected. This accordingly affords a satisfactory degree of protection of the other reactor structures contained in the pressure vessel.

The present invention is concerned with another design concept of a core catcher in which the circulating liquid metal coolant is confined within an enclosed space, said core catcher being so arranged as to prevent any collected core debris from coming into contact with the pressure vessel.

To this end, the device under consideration essentially comprises a collecting tray having a large area which is placed beneath the reactor core and pierced by a central chimney, and a bearing structure for said collecting tray extending in the form of a shell which is substantially parallel to the bottom wall of the pressure vessel, there being delimited between the bottom wall, the diagrid support structure and the diagrid an enclosed space which contains the collecting tray and in which a natural circulation of liquid metal can be induced under the action of the temperature differences arising from the fuel deposited on the collecting tray and by virtue of the presence of the chimney, said natural circulation being such as to ensure sufficient cooling of said fuel.

During normal operation, the liquid metal contained in the enclosed space thus defined is practically stagnant except for leakages at the bottom end-fittings of the fuel assemblies through the diagrid and collected within said enclosed space, the leakage flow being intended to serve in a manner known per se to supply an annular region which is located between the pressure vessel and a parallel baffle wall and communicates with said enclosed space. In the event of a major accident which results in particular in partial or total melt-down of the reactor core, the core is collected on the tray within said enclosed space and produces an appreciable rise in temperature of the liquid metal in which said tray is immersed. A circulation of liquid metal is consequently established between the hot zone constituted by the collecting tray and the colder zones constituted by the walls which delimit said space, i.e. the walls forming the diagrid and the diagrid support structure and especially that surface of the diagrid support structure which is in contact externally with the mass of colder liquid metal contained in the pressure vessel.

By virtue of these arrangements, the tray which serves to collect the debris from the molten reactor core can be placed beneath the core in the lowest portion of the enclosed space in such a manner as to ensure that said collecting tray has the largest possible area and extends in particular beyond the lateral limits of the reactor core.

Preferably and in accordance with a particular feature of the invention, the collecting tray which is placed beneath the reactor core has a circular peripheral contour and a slightly conical shape from the periphery to the center in order to facilitate the circulation of liquid metal within the enclosed space. As an advantageous feature, the central chimney for the circulation of liquid metal is provided with an inclined top cover-plate carried by small columns, said cover-plate being intended to protect the pressure vessel against elements of the molten reactor core which fall onto the collecting tray.

In accordance with a secondary feature, the collecting tray can have two walls separated if necessary by a clearance space. The top wall is advantageously formed by successive adjacent sheet metal elements provided with an overlapping zone from one element to the next.

In accordance with a further distinctive feature, the collecting tray is supported on the bearing surface by means of a rigid structure constituted by vertical radial ribs which carry the collecting tray and are braced with respect to each other by means of circumferential stiffening members. The ribs are preferably provided with notches in order to reduce thermal stresses on those edges of said ribs which are in contact with the collecting tray and with openings for the circulation of liquid metal between said ribs.

In accordance with yet another distinctive feature, the bearing surface which supports the collecting tray is suspended from the diagrid support structure by means of suspension members, that face of said bearing surface which is directed towards the pressure vessel being provided with shoes which are capable of coming into contact with said vessel in the event of failure of said suspension members.

Further distinctive features of a core catcher device constructed in accordance with the invention will become apparent from the following description of one exemplified embodiment which is given by way of indication without any limitation being implied, reference being made to the accompanying drawings, wherein:

FIGS. 2 and 2A shows two transverse half-sectional views respectively on the bottom portion and on the top portion of the core catcher which is illustrated in FIG. 1, these views being taken respectively along lines 2—2 and 2A—2A of FIG. 1;

Figure 1:
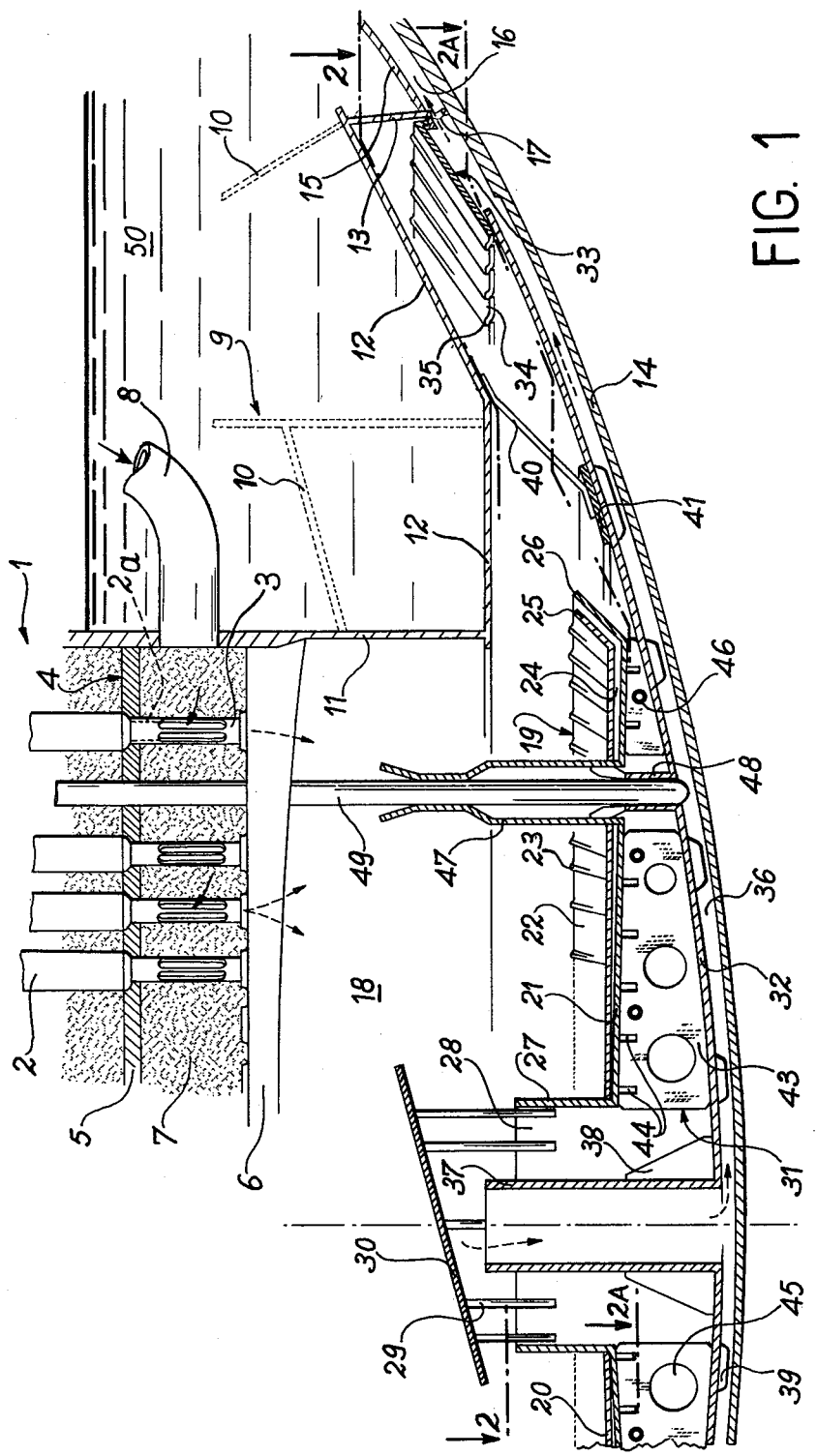
FIG. 1 is a diagrammatic and fragmentary axial sectional view of the bottom of the pressure vessel of a liquid-metal cooled fast reactor, said pressure vessel being associated with a core catcher in accordance with the invention.

In FIG. 1, the reference numeral 1 generally designates the core of a fast reactor, the constructional detail of which is already well known and therefore does not appear to be of interest to anyone versed in the art. It can briefly be mentioned that the reactor core is constituted by a series of fuel assemblies 2, only the lower ends of which are shown diagrammatically in this figure. Said fuel assemblies are each provided in particular with a bottom end-fitting 2a which is adapted to engage in cylindrical support columns 3 carried in a horizontal diagrid 4. Said diagrid is formed by a top bearing plate 5 and a bottom support plate 6, said plates being braced by the columns 3 which receive the bottom end-fittings 2a of the fuel assemblies 2. A manifold 7 is thus defined between the plates 5 and 6 for a liquid metal which serves to cool the fuel assemblies during operation of the reactor. Said liquid metal is introduced under a suitable circulation pressure within the manifold 7 through large-section ducts 8 which are connected on the one hand to the diagrid and on the other hand to circulating pumps (not shown in the drawings), is admitted through lateral slots formed in the support columns 3, then into the bottom end-fittings 2a of the fuel assemblies and then flows upwards within these latter, the flow path of the liquid metal being shown diagrammatically by means of arrows in full lines.

The diagrid 4 is in turn carried on a metallic structure 9 formed by mechanically welded sheet metal members 10. The constructional detail of said metallic support structure does not have any direct bearing on the invention and is therefore not shown in detail in the drawings. Beneath the diagrid 4, the support structure 9 comprises only a lateral cylindrical shell 11 joined to a base plate 12. Said base plate is in turn supported by means of a cylindrical shell 13 or the like on the bottom wall 14 of the pressure vessel of the reactor.

In accordance with conventional practice, the pressure vessel contains the entire reactor core, the volume of liquid metal which is necessary for cooling the core and finally the pumps and heat exchangers which are arranged at intervals around the core, these structural elements having been omitted from the drawings.

In accordance with another known arrangement, the bottom wall 14 of the pressure vessel and especially the sides are provided internally with a parallel lining plate or baffle wall 15 which extends over the entire surface of the side wall of the pressure vessel and delimits an annular region 16 with said wall. Said region is reserved for the circulation of a by-pass flow of liquid metal derived from the diagrid 4 which supports the fuel assemblies 2 of the reactor core. Said by-pass flow results in particular from leakages of liquid metal which take place at the bottom end-fittings 2a of the fuel assemblies 2 and flow beneath the diagrid 4 in the direction of the broken-line arrows. The leakage flow of liquid metal accordingly supplies the region 16 after passing through orifices 17 formed in the bearing shell 13 of the diagrid support structure 9.

The support structure 9, especially its lateral cylindrical shell 11 and its base plate 12, serves to delimit together with the bearing shell 13, the diagrid 4 and the bottom wall 14 of the pressure vessel, an enclosed region or space 18 which contains a single collecting tray 19 in accordance with the invention. Said tray is capable of collecting debris from the molten reactor core as a result of a major accident which has produced a temperature rise of sufficient magnitude. In the example construction shown in the drawings, the collecting tray 19 is constituted by two walls 20 and 21 each having a circular peripheral contour and, as shown in cross-section in FIG. 1, a slightly conical profile which is upwardly inclined from the periphery to the center of the tray. The wall 20 is advantageously formed by a series of plates 22 placed in adjacent relation and provided from one plate to the next with an overlapping zone 23 in order to form a continuous surface. The wall 21 is flat and continuous. Said walls 20 and 21 are separated by a clearance space 24 so that the wall 20 can thus constitute a thermal shield for the wall 21. Finally, raised edges 25 and 26 respectively are formed at the ends of said walls 20 and 21. By virtue of this arrangement, the tray 19 is capable of collecting in a suitable manner any molten debris which may fall from the reactor core fuel assemblies 2.

The collecting tray 19 is provided in the central portion with a vertical chimney 27 located in the axis of the pressure vessel 14 beneath the diagrid 4. Said chimney delimits internally a vertical passage 28 which makes it possible for the liquid metal contained within the enclosed space 18 to circulate around the collecting tray 19 if necessary. The upper end of said chimney 27 is rigidly fixed to an inclined cover-plate 30 by means of a series of small vertical columns 29. Said inclined cover-plate is mounted above the chimney 27 in such a manner as to ensure that any debris which may fall from the reactor core in the event of melt-down are deflected towards the interior of the collecting tray 19 and not directly towards the bottom wall of the pressure vessel 14 while at the same time preventing any possible accumulation of vapor of the liquid metal coolant beneath said cover-plate.

The collecting tray 19 is supported on a structure 31 on a bearing surface 32 in the form of a shell which is provided within the space 18 and extends substantially parallel to the bottom wall 14 of the pressure vessel. In accordance with a particular feature of the invention, the lateral extremity of said surface 32 is connected by means of a member 33 to the diagrid support structure 9 and in particular to the bearing shell 13 of this latter. Preferably, the member 33 is constituted by a series of adjacent sheet metal elements 34 each provided with an overlapping edge 35 from one member to the next, thus forming a continuous structure for preventing any debris from the reactor core which may be carried down by the circulation of liquid metal from being deposited on the bottom wall 14 of the reactor vessel. Said liquid metal within the enclosed space 18 remains practically stagnant during normal reactor operation except for the small flow which is derived from leakages at the bottom end-fittings 2a of the fuel assemblies 2 and fed to the annular space 16 by being caused to flow beneath the bearing surface 32 within the region 36 delimited with the bottom wall 14 of the reactor vessel. This by-pass flow is introduced into said region 36 from a vertical duct 37 arranged in the axis of the chimney 27 and rigidly fixed in position with respect to the surface 32 by means of lateral gusset-plates 38.

That wall of the bearing surface 32 which is directed towards the bottom wall 14 of the reactor vessel is provided with shoes 39 so that said surface 32 can rest on said bottom wall in the event of accidental failure of a suspension arm 40 welded between the diagrid support structure 9 and a plate 41 fixed separately against the surface 32 which is therefore directly carried by the diagrid support structure during normal operation.

Figure 3:
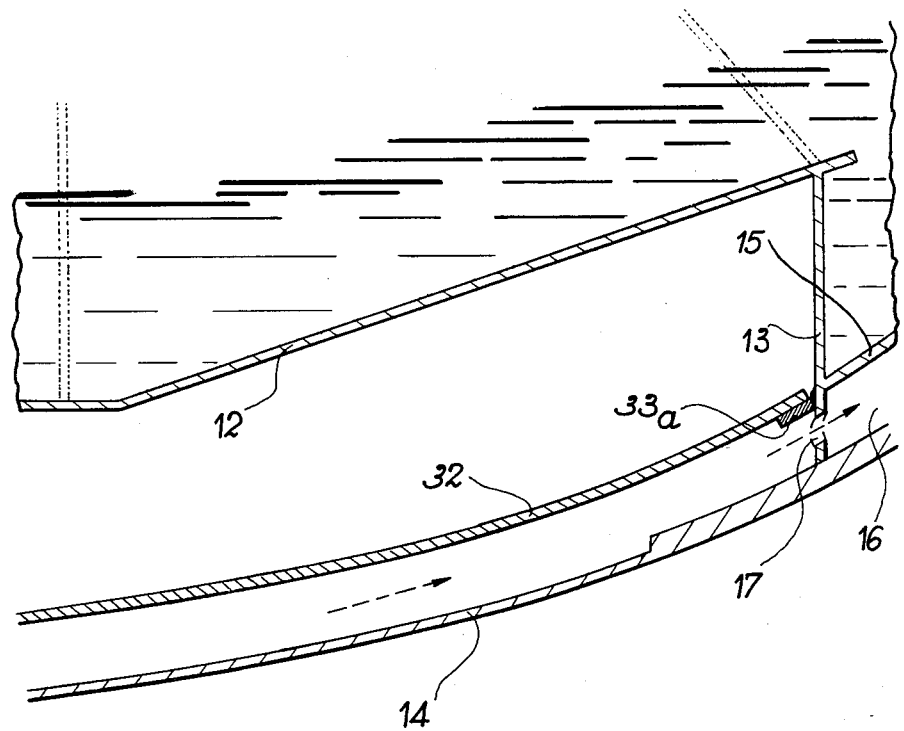
FIG. 3 is a detail view to a larger scale showing another alternative embodiment.

By way of alternative and as illustrated in FIG. 3, the bottom bearing shell 32 is extended to the cylindrical bearing shell 13 and is only supported by an annular reinforcement 33a welded to the underface of said bottom bearing shell. The members 33 and 40 are dispensed with in this alternative embodiment.

Figure 2:
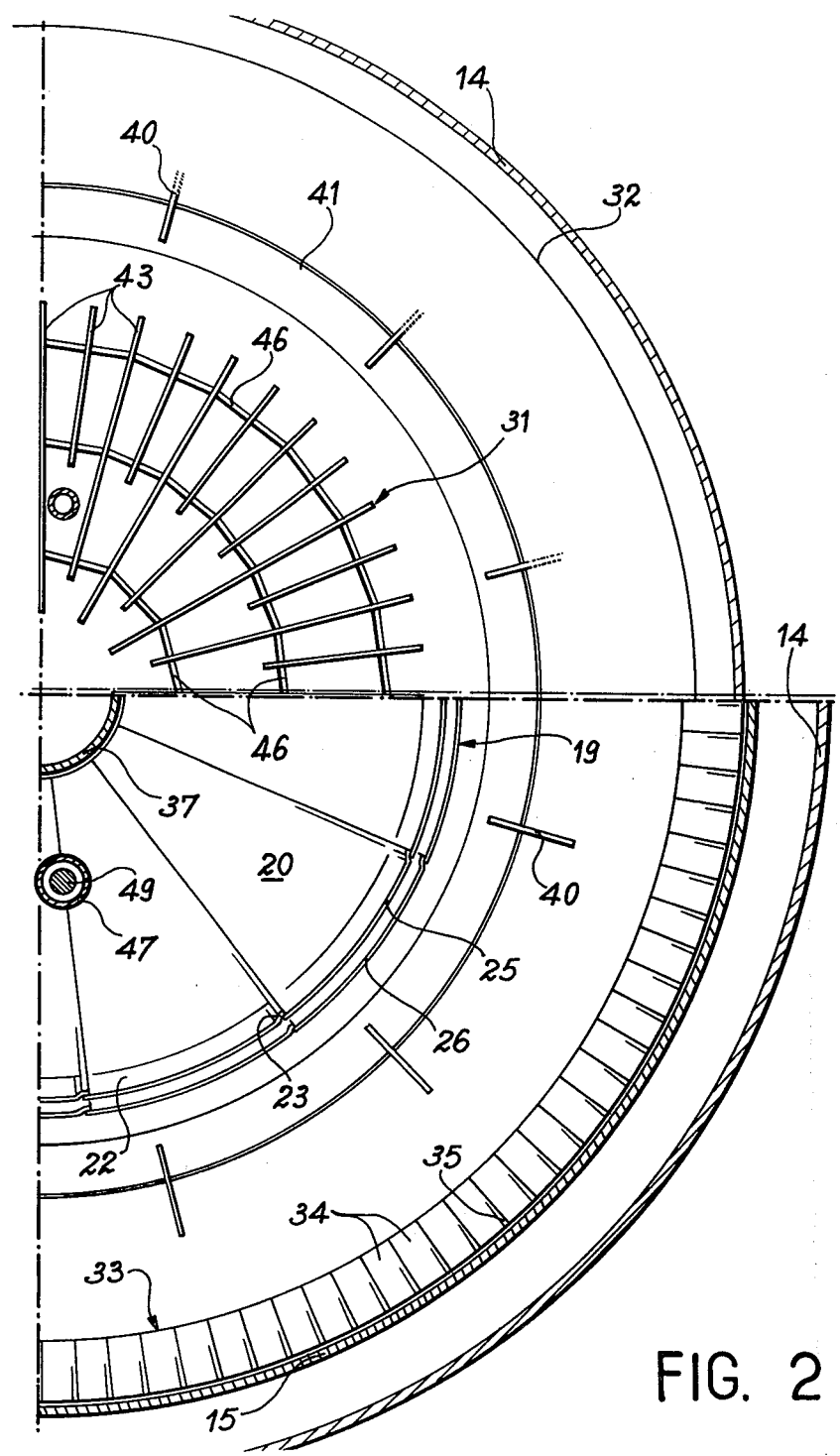

The structure 31 which carries the collecting tray 19 is preferably formed by an array of radial and vertical ribs or plates 43 provided with notches which serve to lighten these ribs and to limit thermal stresses within these latter during reactor operation and with holes 45 for the circulation of liquid metal between the sectors defined by said radial ribs. Moreover, said ribs are advantageously braced with respect to each other by means of tubular and circumferential stiffening members 46, the profile of which can more clearly be seen in the cross-section B-B of FIG. 1 as shown at the top portion of FIG. 2. If necessary, the collecting tray 19 and the bearing surface 32 are provided with sleeves 47 and 48 respectively. Thus a device known as a "neutron guide" 49 of a type known per se is permitted to extend through said sleeves to a point located near the bottom wall 14 of the reactor vessel in order to produce activation of an ionization chamber (not shown) provided on the opposite side of said vessel wall.

By virture of the position of the collecting tray 19 within and at the bottom portion of the enclosed space 18, the core catcher as thus constructed is not only permitted to extend entirely beneath the reactor core 1 but also to have the maximum area by extending in particular beyond the limits of the reactor core. In consequence, the entire quantity of debris collected in the tray can be distributed over the surface of this latter to a very small depth. This accordingly avoids the need for a complex design of core catcher in the form of a large number of adjacent but separate cups as was the case in the prior art. It can be mentioned by way of indication that, in the design solution contemplated by the invention and consisting of a single collecting tray, the depth of molten fuel corresponding to the complete core of a 1200 MWe reactor will be of the order of 7 cm, thus permitting of efficient cooling and removing any potential danger of criticality. During operation, cooling of the molten fuel contained in the collecting tray 19 is produced by the mass of liquid metal confined within the enclosed space 18 and circulated by convection between the hot zone constituted by the tray 19 itself and the cold zone formed by those regions of the support structure 9 and of the diagrid 4 which are in contact with the cold liquid metal contained in the external region 50. The position of the collecting tray 19 in the lowest portion of the enclosed space 18 is thus conducive to the most profitable use of the heat-transfer surface formed by the walls which provide a separation between the volume of liquid metal heated by the collecting tray and the colder volume contained in the reactor vessel itself. The slightly conical shape of the bottom of the collecting tray also makes it possible to improve the conditions of this circulation to an appreciable degree.

We claim:

1. A core catcher device for a liquid metal cooled fast nuclear reactor comprising a pressure vessel with a bottom wall and containing a reactor core and liquid metal coolant and a core-supporting diagrid carried by a diagrid support structure on said bottom wall, wherein said device comprises a collection tray placed beneath the reactor core and pierced by a central chimney, the area of said tray being larger than the horizontal cross sectional area of said core, and a bearing structure for said collection tray having the form of a shell extending substantially parallel to said bottom wall of said pressure vessel, there being delimited between said bottom wall, said diagrid support structure and said diagrid an enclosed space which contains said collection tray, said tray dividing said space into upper and lower portions which communicate through said chimney and in the event of deposit of molten fuel on said tray, permitting circulation of liquid metal coolant from said lower to said upper space and thence through a peripheral passage surrounding said tray and allowing a simultaneous downward flow of coolant from said upper to said lower portion thus insuring cooling of molten fuel in said tray.

2. A core catcher device according to claim 1, wherein the collecting tray placed beneath the reactor core has a circular peripheral contour and a slightly conical shape from the periphery to the center.

3. A core catcher device according to claim 1, wherein the central chimney is provided with an inclined top cover-plate carried by small columns.

4. A core catcher device according to claim 1, wherein said collecting tray comprises two parallel walls separated by a clearance space.

5. A core catcher device according to claim 4, wherein one of said walls is a top wall formed by successive adjacent sheet metal elements provided with an overlapping zone from one element to the next.

6. A core catcher device according to claim 1, wherein the collecting tray is supported on the bearing structure by means of a rigid structure constituted by vertical radial ribs which carry said collecting tray and are braced with respect to each other by means of circumferential stiffening members.

7. A core catcher device according to claim 6, wherein the ribs are provided with notches in order to reduce thermal stresses on those edges of said ribs which are in contact with the collecting tray and with openings for the circulation of liquid metal between said ribs.

8. A core catcher device according to claim 1, wherein the bearing structure which supports the collecting tray is suspended from the diagrid support structure by means of suspension members.

9. A core catcher device according to claim 8, wherein that face of the bearing structure which is directed towards said pressure vessel is provided with shoes spaced from said vessel but adapted to contact said vessel in the event of failure of said suspension members.

* * * * *